US005834772A

United States Patent [19]

Baumgardner et al.

[11] Patent Number: 5,834,772

[45] Date of Patent: Nov. 10, 1998

[54] MASS SPECTROMETER PROBE FOR MEASUREMENTS OF GAS TENSIONS

[76] Inventors: James E. Baumgardner, 2519 Webster St., Philadelphia, Pa. 19146; Gordon R. Neufeld, 6015 W. Valley Green Rd., Flourtown, Pa. 19031

[21] Appl. No.: 540,688

[22] Filed: Oct. 11, 1995

Related U.S. Application Data

[63] Continuation of Ser. No. 416,018, Apr. 3, 1995, abandoned, which is a continuation of Ser. No. 311,218, Sep. 23, 1994, abandoned.

[51] Int. Cl.[6] .................................................... B01D 59/44

[52] U.S. Cl. .............................................................. 250/288

[58] Field of Search ............................... 250/288, 288 A, 250/281, 282, 423 R

[56] References Cited

U.S. PATENT DOCUMENTS

| | | | |
|---|---|---|---|
| 3,867,631 | 2/1975 | Briggs et al. | 250/288 |
| 4,439,679 | 3/1984 | McIlroy et al. | 250/288 |
| 5,214,343 | 5/1993 | Baumock | 310/334 |
| 5,270,542 | 12/1993 | McMurry et al. | 250/288 |

FOREIGN PATENT DOCUMENTS

| | | | |
|---|---|---|---|
| 0101845 | 8/1980 | Japan | 250/288 |

*Primary Examiner*—Keit T. Nguyen

[57] ABSTRACT

A mass spectrometer probe comprising a tubing having one end adapted for connection to a spectrometer and a second probe tip having a pore cut therethrough, the pore being sealed with a membrane such that the membrane eliminates water from the mass spectrometer system and admits low molecule weight gases into the system.

16 Claims, 4 Drawing Sheets

MASS SPECTROMETER PROBE FOR MEASUREMENTS OF GAS TENSIONS

CROSS REFERENCE TO RELATED APPLICATION

This is a continuation of application Ser. No. 08/416,018, filed on Apr. 03, 1995, now abandoned, which is a continuation of application Ser. No. 08/311,218, filed on Sep. 23, 1994, now abandoned.

FIELD OF THE INVENTION

The present invention is directed to probes for the measurement of gas tensions. In particular, the present invention is directed to a probe for measuring gas tensions such as in blood and saline, which may be coupled to specialized mass spectrometers.

BACKGROUND OF THE INVENTION

The present invention is directed to mass spectrometer probes for measuring gas tensions. Mechanisms of tissue oxygenation are complex and are not completely understood. The experimental study of the interaction of blood flow, diffusion and metabolism require measurements of gas tensions with a high degree of spatial resolution. Capillary diameters typically range from 6 to 8 microns, which limit spatial resolution.

Oxygen microelectrodes have been used in two ways to measure tissue partial pressure of oxygen ($TPO_2$) with micron range resolution: as a single electrode within a micropipette, driven into tissue with a micromanipulator; or as a flat array of multiple microelectrodes for the simultaneous measurement of several oxygen tensions at the tissue surface.

Mass spectrometry provides a number of advantages over electrode techniques for the study of tissue gas exchange, including an inherent ability to measure a variety of gases and providing exceptional sensitivity. In addition to measurements of $TPO_2$, mass spectrometers can measure partial pressures of $CO_2$ as well as several tracer gases introduced for the study of transport mechanisms. Measurements of tissue gas exchange for a series of gases with a spectrum of physical properties are useful for determining the dependence of transport on tissue and blood solubility, diffusivity and metabolism.

Membrane inlet mass spectrometry (MIMS) has been used to measure gas tensions in aqueous solutions, in both blood and tissue. No currently available MIMS system, however, can provide spatial resolution adequate for studies of gas tensions on a micron scale. The selected introduction of gas components of a fluid into a mass spectrometer has been a long-standing problem.

The prior art has disclosed two types of technologies for measuring liquid phase gas tensions. First, membrane inlet systems have been designed for use in mass spectrometers in which a gas sample is introduced into the mass spectrometer by diffusion through a membrane. These systems typically use a large surface area for the membrane (one square centimeter), which requires a large blood sample to make measurements, and which limits spatial resolution.

MIMS provide the ability to quantify a wide variety of gaseous and volatile species simultaneously. This general property of mass spectrometry contrasts sharply with electrochemical analytic approaches, which are typically restricted to the measurement of only one or two reactive species. Specifically, polarographic microelectrodes have been used to quantify tissue oxygen tension as well as tissue hydrogen clearance. They cannot measure tensions of other gases of interest.

Mass spectrometer techniques excel for the measurement of multiple species, including inert gases that are used as tracers in studies of gas exchange. There are some restrictions on the nature of molecules that can be examined with membrane inlet systems. MIMS is most suitable for use with low molecular weight, nonpolar molecules.

With such systems, the limited spatial resolution makes it impossible to measure gas tension gradients, an important factor in some research applications. The larger surface area required for mechanical stability substantially limits the time response. In addition, many of the membrane inlet systems that have been reported use a much higher gas sampling rate which leads to diffusional limitations in the liquid phase thereby making the device impossible to calibrate in situ. Membrane-covered electrodes have been very useful for physiological measurements of the partial pressures of certain gases in the liquid phase. These electrodes are available commercially for $O_2$, $CO_2$ and $H_2$. Electrodes can be made very small at the probe tip thereby permitting an excellent spatial resolution.

Unfortunately, electrode approaches have two intrinsic limitations. First, they require a large gas sample rate. Secondly, only certain reactive gas species can be measured. Mass spectrometers are intrinsically able to measure gas tensions with a smaller gas sample rate than are electrodes. At present, all previous electrodes for $O_2$ and $CO_2$ have required a large enough gas sample to induce stirring, thereby making in situ calibration difficult. Further, membrane-covered electrodes can only measure reactive species and not gases that are physiologically inert.

The prior art patent literature has disclosed several technologies using membrane and capillary-based technologies for facilitating gas tension measurement. U.S. Pat. No. 5,306,412, for example, teaches the use of mechanical vibration to enhance the electrostatic dispersion of sample solutions into the small, highly charged droplets that can produce ions of solute species for mass spectrometric analysis. The vibration is effective at ultrasonic frequencies for solutions with flow rates, conductivities and surface tensions too high for stable dispersion by electrostatic forces alone as in conventional electrospray ionization.

U.S. Pat. No. 4,439,679 discloses a device for the measurement of the tension of blood gases and resistance of the skin to the flow of such gases. The invention comprises a body having a gas permeable boundary comprising two gas permeable membranes for placement on the skin of the subject, two gas collection chambers in the body connected to a gas analysis system, a heating device to heat the skin area under the boundary and control means operable to control the heating device.

U.S. Pat. No. 4,791,292 discloses a capillary membrane interface for a mass spectrometer. The probe includes conduit passageways for permitting bi-directional fluid flow through diffusion in the capillary. See also U.S. Pat. No. 5,078,135.

Each of the above devices has a number of deficiencies. There has been a long-felt need for a single membrane probe for use in conjunction with mass spectrometers which exclude water and polar compounds which provide extremely low gas sample rates using a novel pore structure. Such a probe could be utilized to measure gas tensions of gases found in blood and saline such as $O_2$, $CO_2$, He and Xenon. Such a membrane could provide no stirring effect, a high spatial resolution and rapid response speed. The prior art systems provide either no stirring effect or a rapid response time but not a combination of the two.

SUMMARY OF THE INVENTION

In accordance with the present invention, a mass spectrometer probe is disclosed. The invention comprises a tubing having one end adapted for connection to a spectrometer, and a second end defined as a sealed probe tip and having a pore extending therethrough, said pore being covered with a membrane such that said membrane prevents water from entering the tubing and permits low molecule weight gases to enter the tubing.

In a more preferred embodiment, the present invention is directed to a mass spectrometer probe for measurement of gas tensions comprising a steel tubing comprising a shaped welded tip at one end and adapted at a second end to a vacuum fitting for connection to a mass spectrometer system, said shaped tip containing a pore to permit the leak of gas into said probe, a membrane affixed over said pore such that said membrane only permits low molecular weight gases into the probe.

In yet a further embodiment, the invention is directed to a mass spectrometer probe for measurement of gas tensions in blood and saline comprising a stainless steel tubing comprising a hemispherically shaped welded tip at one end and adapted at a second end to a vacuum fitting for connection to a mass spectrometer system, said solid hemispherical tip containing a pore to permit the leak of gas into said probe, a membrane affixed over said pore such that said membrane only permits low molecular weight gases into the probe when attached to a spectrometer.

The present invention is also directed to a method for constructing a mass spectrometer probe for measurement of gas tensions comprising the following steps: sealing a hollow tubing at one end with a solid tip, filing a pore at one spot on said solid tip, inducing a vacuum in the tubing such that a gas leak enters the tubing at said pore, sealing said pore upon the achievement of a desired leak rate with a teflon membrane material such that only low molecular weight gases permeate said membrane.

The present invention is thus directed to a membrane inlet system for use with a mass spectrometer which excludes water and polar compounds, while admitting gases for analysis. The present invention can thus be used to measure gas tensions of oxygen, carbon dioxide, helium, argon, and nitrous oxide in aqueous solutions (including blood and saline) which are prepared for calibration of the probe.

The present invention provides an extremely low gas sample rate to measure liquid phase gas tensions. Prior systems have used a high gas sample rate which induced diffusional resistance in the liquid layers surrounding the membrane. The measurement system signal then depended partly on the amount of stirring of the liquid, as well as protein deposits on the membrane, neither of which could be controlled during the measurement. The calibration performed in vitro therefore could not apply to the probe during the measurements, and there was no accurate way to calibrate the system in situ.

In the present invention, by contrast, the gas sample rate is of such a low level, that there is minimal diffusional resistance in the liquid layer. All of the diffusional resistance lies within the membrane itself, and the probe is not sensitive to changes in liquid stirring, thus making the measurements more quantitative.

Further, the low gas sample rate characterized by the present invention permits gas tension measurements appearing in very small blood samples. Using a mass spectrometer-base system for these measurements provides a distinct advantage over electrode-base systems in that the mass spectrometer can measure a wide variety of gas species.

Finally, the pore or leak in the probe permits the entry of extremely small samples of gas into the mass spectrometer system. The probe tip can therefore be miniaturized so that measurements can be taken inside arterioles and venules. These and other features of the present invention will become clear from the following detailed description and claims appended thereto.

DETAILED DESCRIPTION OF THE PRESENT INVENTION

Figure 1:
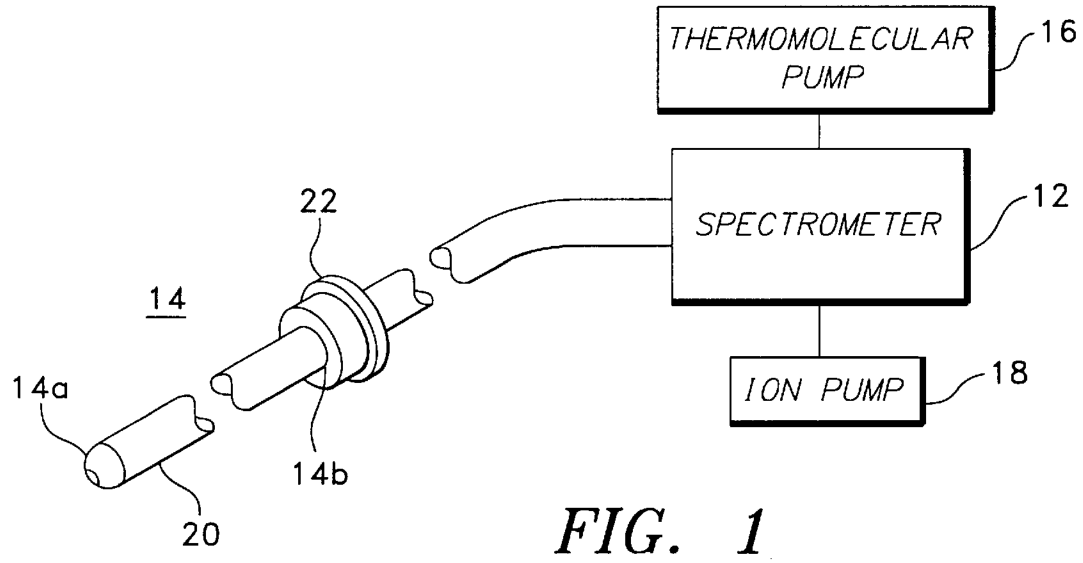
FIG. 1 is a block diagram of the system which utilizes a mass spectrometer system incorporating the probe of the present invention.
Figure 2:
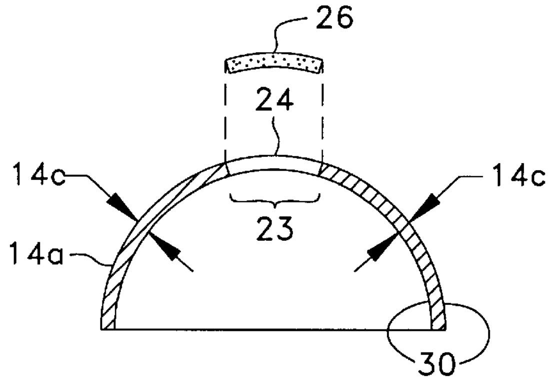
FIG. 2 is a side perspective view of a probe and membrane in accordance with the present invention.
Figure 3:
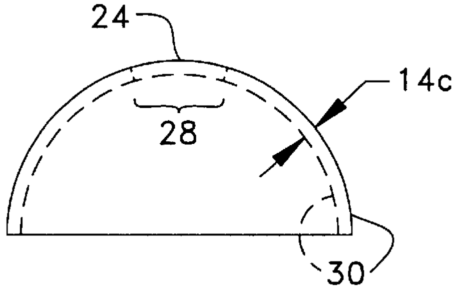
FIG. 3 is a side view of the mass spectrometer probe in accordance with the present invention.
Figure 4:
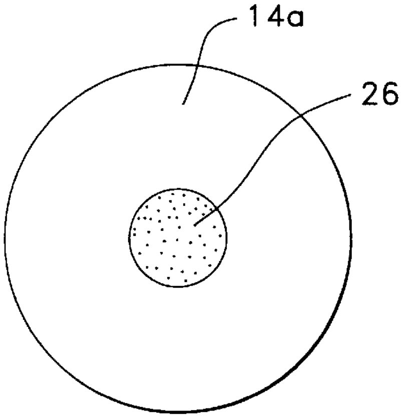
FIG. 4 is an overhead view of the probe and membrane of the present invention.

The present invention is described with reference to the enclosed Figures wherein the same numbers are utilized where applicable. The present invention is directed to a system which couples a novel membrane inlet probe 14 with a mass spectrometer 12 in such a way as to permit measurement of partial pressures of low molecular weight, non-polar gases in liquids, such as those found in blood or saline.

A key feature of the present invention is the provision of an extremely low sampling rate that is required to measure the liquid phase gas tensions. By using very low sample rates, the mass spectrometer probe of the present invention does not induce any significant diffusional resistance in the liquid. The present system eliminates the difficult problem of calibration of membrane inlet systems in situ.

In accordance with the present invention, the present invention includes a mass spectrometer 12 which preferably includes a quadruple type of mass spectrometer (UTI 100 C) that is designed for moderate resolution and very high sensitivity. In a preferred embodiment, this mass spectrometer is housed in an all metal vacuum system with tandem thermomolecular and ion pumps 16, 18.

The novel probe 14 of the present invention is now described with reference to FIGS. 2–5. In principle, the probe 14 of the present invention could be connected to any mass spectrometer. For example, very low gas sampling typically requires a mass spectrometer system that includes an electron multiplier, housed in a vacuum system, which is capable of very high temperature and high vacuum bake-out cycles.

The probe of the present invention is now described in detail. Initially, the probe 14 is constructed from a metal such as a specially welded metal stainless steel tubing 20.

The probe 14, in a preferred embodiment, comprises a cylindrical hollow tubing 20. It is to be appreciated that while the tubing 20, in a preferred embodiment, is shown as being constructed from stainless steel and having a cylindrical cross-section, it may also be constructed of numerous alternative metals and alloys, or glass, and may have other cross-sectional shapes. The tip of the probe 14*a* is welded so as to form a seal.

In a preferred embodiment, the sealed probe tip 14*a* is hemispherical in shape and the cross-sectional wall thickness of the tip is preferably constant throughout the weld 14*c*. It is to be appreciated that while the shape of the probe tip 14*a* has been disclosed as having a hemispherical shape, the probe tip 14*a* may comprise other geometric shapes and configurations.

The second end of the probe 14*b* is soldered to an ultra-high vacuum fitting 22, which is then connected via hosing 25 to the mass spectrometer system. The fitting 22 provides a hermetical seal with the spectrometer 12.

A leak or pore 24 is then cut into a spot on the uniform welded probe tip 14*a*. In a preferred embodiment, the leak or pore 24 is created by carefully filing the tip of the probe 14*a* while inducing a vacuum in the probe and monitoring the gas leak rate into the mass spectrometer 12. When a desired leak rate is achieved, the leak or pore 24 is sealed with a porous polymer 26.

In a preferred embodiment, the porous polymer 26 comprises a very low vapor pressure PTFE (TEFLON®) that functions as a "membrane" in order to keep water out of the mass spectrometer system, while admitting low molecular weight gases into the system. In a most preferred embodiment, the porous polymer may comprise a polymeric grease such as KRYTOX®. The KRYTOX® provides a linear gas sample rate with respect to outside gas pressure.

It is to be noted that the pore may be filled with other materials such as PTFE, polyethylene, polypropylene or any water impermeable polymer which may be formed into a paste, packed and cured. Further, the material can be selected to enhance the permeation of specific gases such as sulfur hexafluoride, diethyl ether, or acetone.

It is to be noted that the spatial resolution of the probe is primarily a function of membrane area, which for the probe of the present invention is determined by the diameter of the polymer-filled pore. Because sample flux is directly related to membrane area, reductions in membrane area proportionately reduce the mass spectrometer signal for a given gas partial pressure in the aqueous solution. The theoretical limitation to membrane area, then, is determined by the signal to noise ratio of the mass spectrometer at low sample rates. Modern residual gas analyzers, typically those which use large aperture quadrupole mass filters, electron multipliers, and open grid, long pathlength EI ionization, are sufficiently sensitive that they do not usually limit the ultimate membrane area.

The quality of the vacuum system enclosing the mass spectrometer of the present invention is also important. The presence of substantial vacuum system background at the mass/charge ratios of interest provide a lower limit for measured current, which in turn can prevent realization of the maximum sensitivity of the instrument.

It is to be noted that reductions in vacuum system outgassing rates relative to sample flux rates are especially important for respiratory gases (oxygen and carbon dioxide) and argon, which tend to maintain substantial background peaks after atmospheric venting. Several physiologically inert gases (e.g., helium, SF6, Xe, Kr), by contrast, tend to show little interference from vacuum system background even after atmospheric venting, and in general also have little spectral overlap at their parent mass/charge peaks. In the present invention proper results are achieved by the avoidance of polymers in the vacuum system, tandem turbomolecular and ion vacuum pumping, reduction of the size of the vacuum housing as much as physically feasible, and high temperature baking for 2–3 weeks after each atmosphere exposure. A low vacuum system background also permits increased ionization efficiency by the very simple maneuver of choking the high vacuum pump (throttling) during the measurements, which directs each uncharged molecule through the ion source several times. In addition to limits in basic mass spectrometer sensitivity, reduced membrane area also depends on the practical matter of creating a small pore and filling it with membrane material 26, and producing a leak tight seal around the edges.

Effective membrane area 26 cannot be accurately determined without an accurate measurement of gas sample rate. The limiting factor in the accuracy of the calculation is an estimate of ionization efficiency for the EI source. However, usual estimates of efficiency for EI ionization range from 0.0001 to 0.001. Assuming the use of an open grid, long pathlength electron impact ion source operates at the upper end of this range, we can calculate that a measured current for argon of $10^{-14}$ A corresponds to an argon sample rate of $1.4\times10^{-10}$ ml (STP)/min (assuming 100% efficiency for the mass filter, and with corrections for the EM gain supplied by the manufacturer). The membrane thickness, as estimated from time response data, is 2.5 microns (25,000 Å).

Permeability data for argon in KRYTOX® have not been reported, but it is assumed that values for diffusivity of argon in high density polyethylene ($0.116\times10^{-6}$ $cm^2$/sec) and solubility of argon in high density polyethylene (0.010 ml(STP)/$cm^3$-atm) will provide reasonable approximations. Membrane area can then be estimated as $5.1\times10^{-8}$ $cm^2$ from $$A = \frac{Q \cdot \delta}{P \cdot a \cdot D}$$

where Q is the gas sample rate, δ is the membrane thickness, P is the argon partial pressure in the analyte, a is the solubility of argon in the membrane, and D is the diffusivity of argon in the membrane. Assuming a cylindrical pore geometry, this gives an estimate of 2.5 microns for the pore diameter.

The flat metal surface of roughly 800 microns that surrounds the pore 24 and its membrane obviously impedes gas flux in the vicinity of the pore and potentially can play a role in limiting spatial resolution for measurement of tissue gas tensions. However, in many cases the appropriate boundary condition for measurement of gas tensions at the tissue surface is zero flux, in which case the flat metal surface is advantageous.

The dimensions of the pore 24 created by filing are approximately 25,000 Å in width 28 and approximately four microns in depth 30. These dimensions are consistent with the defect at the grain boundary between crystals in the weld. The probe 14 of the present invention is highly useful as a research tool to make perivascular measurements of gas tensions ($O_2$, $CO_2$, $H_e$, Xenon) in saline perfusate in a vital microscopy preparation.

As is known by those skilled in the art, stirring effect, or stirring artifact, refers to the difference between the calibration factors for gas tension measured in an unstirred liquid versus agitated liquid. Stirring effect can be minimized by maximizing the membrane diffusional resistance relative to the diffusional resistance in the liquid medium, and is quantified by the ratio of output signals (at identical gas tensions) in still and stirred liquid.

Membrane diffusional resistance is directly proportional to membrane thickness and inversely proportional to the product of gas solubility and gas diffusivity in the membrane. As membrane diffusional resistance is increased to minimize stirring artifact (either by choice of less permeable polymers or thicker membranes), the gas sample rate for a given gas tension decreases proportionately, and the ultimate limit to minimal stirring effect is therefore a function of the signal to noise ratio at low gas sample rates. The role of vacuum system background in limiting ultimate instrument sensitivity for respiratory gases is discussed above.

Figure 7:
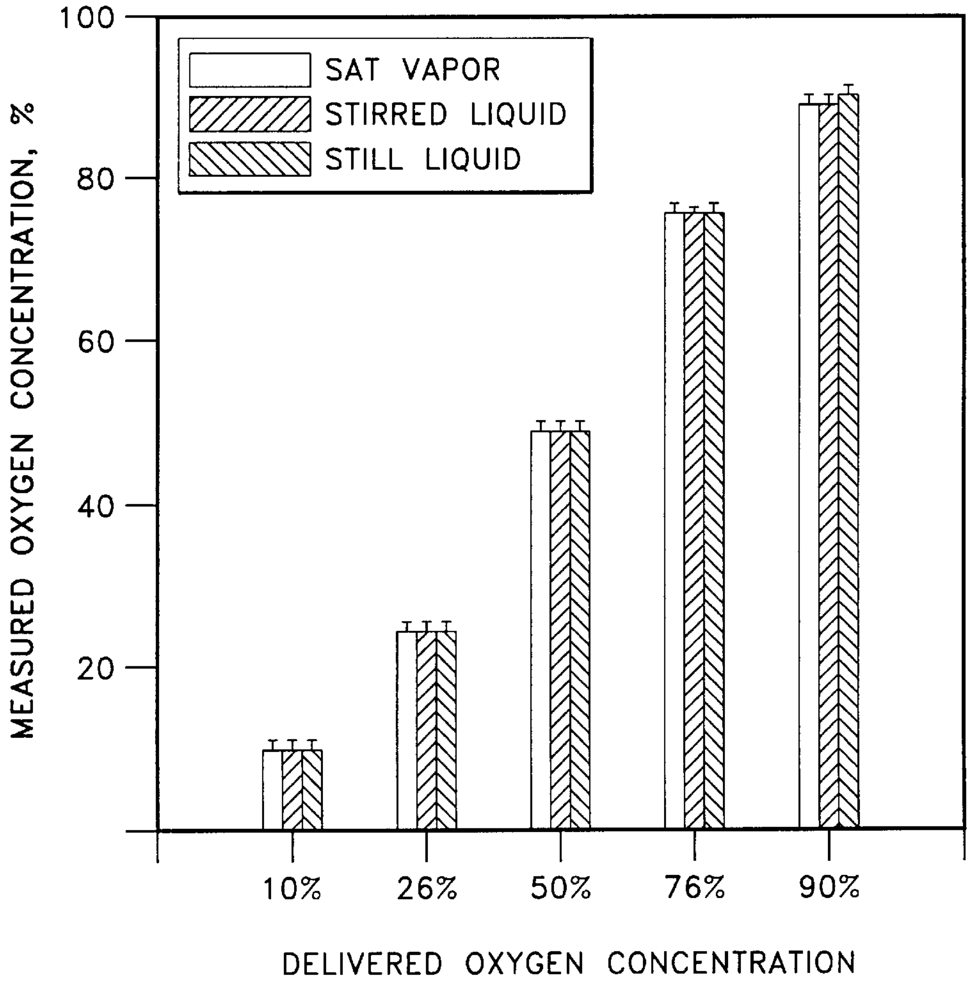
FIGS. 7–8 are graphical representations of oxygen and helium stirring effect, respectively.
Figure 8:
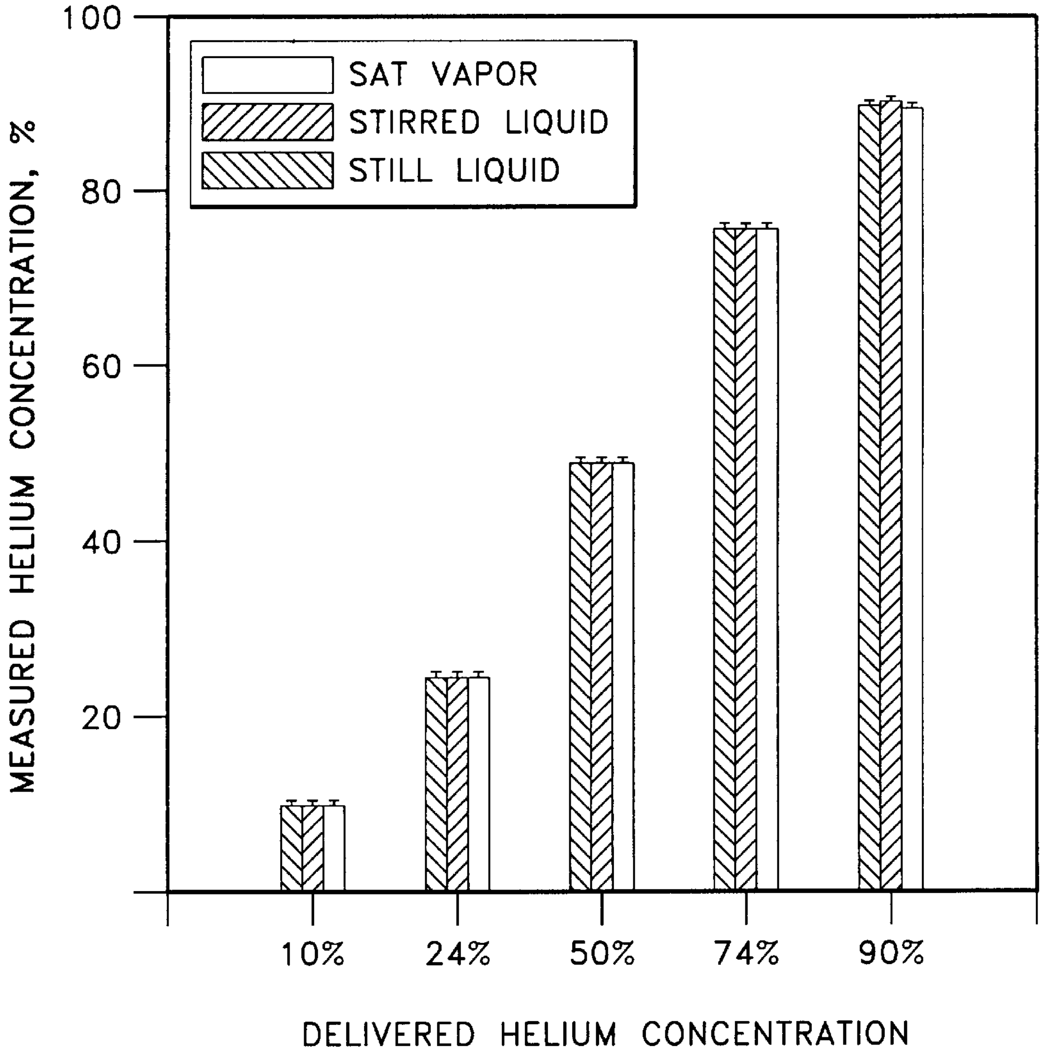

FIGS. 7–8 illustrate the negligible stirring effect in the present invention. The insoluble gases helium and SF6, which are predicted to have a larger stirring artifact than the soluble gases, show a difference between still and agitated liquid of less than 1%, and the more soluble gases show an undetectable stirring artifact. Negligible stirring effect is advantageous for tissue surface gas tension measurements, because the measurement system calibration becomes independent of the local flow velocity.

In most in-vivo applications, for example the measurement of tissue surface gas tensions within a layer of superfusate covering the tissue, the local flow velocity is unknown. For other applications, in which bulk fluid is sampled and pumped across the membrane (such as measurement of gas tensions in discrete blood samples), the flow velocity can be controlled, but typically the resistance in the blood layer increases as proteins adhere to the membrane surface. In this case, small stirring artifact will reduce the need for frequent recalibration. In addition, flow rates of a sampled fluid can be reduced when stirring effect is small, and therefore blood sample volume can be minimized.

A rapid time response for measurements of gas tensions in aqueous media will be advantageous for many applications, such as the measurement of tissue gas tensions in vivo, and experimental study of reaction kinetics in biochemical fermentation reactors. The time response associated with diffusion through the membrane usually dominates the overall time response for MIMS. For the simple one dimensional geometry of a planar sheet of membrane, the time dependent increase in membrane flux has been shown to be $$\frac{Q_t}{Q_{ss}} = 1 + 2 \cdot \sum_{n=1}^{\infty} (-1)^n \cdot e^{-\left(\frac{N^2 \cdot x^2 \cdot D \cdot t}{2}\right)}$$

where Qt is the gas sample rate into the mass spectrometer at time t, $Q_{ss}$. is the steady state gas sample rate, δ is the membrane thickness, and D is the diffusivity of the gas in the membrane.

The time required for flux to reach 50% of its steady state value is then $$t_{50} = \frac{\delta^2}{7 \cdot D}$$

emphasizing the crucial role of membrane thickness in determining membrane time response. The small size of the pore makes it physically possible to achieve a very thin membrane and a rapid time response. The membrane thickness can be estimated by applying equation (3) (assuming that the one dimensional case provides a reasonable approximation for the solution for a cylindrical pore) to the time response data for argon.

For a 50% response time of 80 msec and a diffusivity for argon in high density polyethylene (taken as an approximation of the diffusivity in KRYTOX®) of 0.116×10−6 $cm^2$/sec an effective membrane thickness of 2.5 microns (25,000 Å) is estimated.

As membrane thickness is reduced to improve response speed, the gas sample rate per unit area of membrane increases, potentially leading to increased stirring effect. The present invention demonstrates that the combination of rapid response speed and minimal stirring effect is possible with a cylindrical membrane 26 within a small pore 24. This unique combination is believed to be the result of the three dimensional concentration profiles associated with diffusion through a small pore- the diffusion within the membrane is restricted to one dimension, whereas diffusion gradients within the liquid medium can encompass an entire hemisphere surrounding the pore 24, with the result that the effective area for diffusion in the medium can be much larger than the area for diffusion within the pore 24. This in turn reduces the diffusional resistance within the medium relative to the diffusional resistance of the membrane, resulting in a small stirring artifact despite a thin (and fast) membrane.

Figure 6:
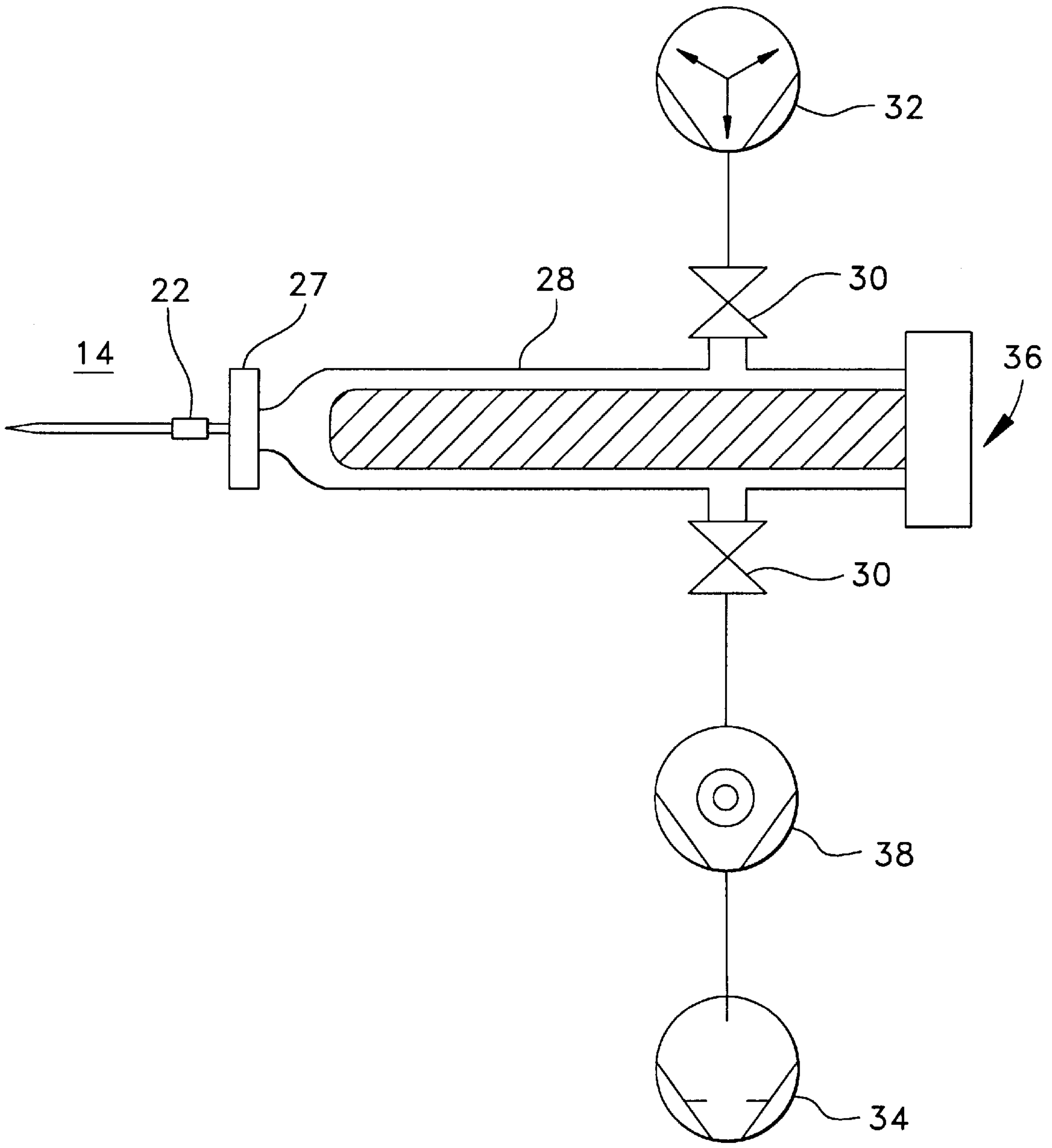
FIG. 6 is an alternative embodiment of the probe of the present invention.

A more comprehensive embodiment of the present invention is shown in FIG. 6. FIG. 6 illustrates an embodiment including the probe 14 of the present invention affixed to a VCR fitting. The VCR fitting attaches to a 2¾ Cf adapter 27. The adapter is affixed to a custom fabricated vacuum chamber 28 such as manufactured by MDC. The vacuum chamber 28 is connected to two Varian all metal isolation valves 30 such as model No. 951-5027. The invention utilizes pumps 32, 34, 38; an ion pump 32 such as the model NP-020 manufactured by Termionics Laboratory, Inc. and a rotary vacuum pump 34 such as the model D8A by Leybold-Heraeus and a turbo molecular pump such as the Leybold-Heraeus Turbovac 150 38. A UTI quadrupole mass spectrometer 36 is mounted to the vacuum chamber with ion source, quadrupole filter and electron multiplier.

Figure 5:
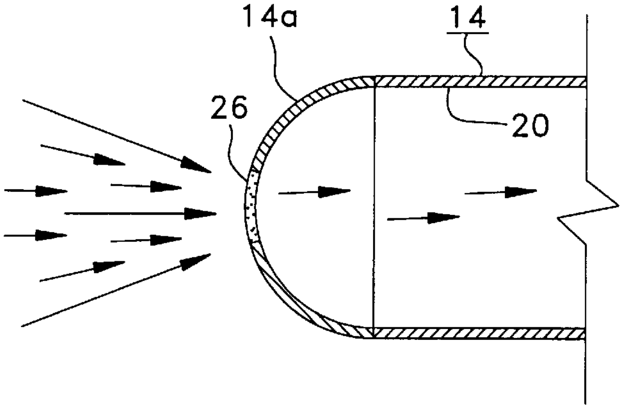
FIG. 5 is an operational example of the probe and membrane of the present invention.

An operational example of the present invention is now shown with reference to FIG. 5. This operation example assumes that the probe 14 is attached to the mass spectrometer such that a vacuum is induced within the probe and that gases are drawn into the probe via the membrane 26. As shown in FIG. 5, the low sample rate of the probes 14 will lead to minimal disturbance of gas tension profiles and therefore the system can measure not only local gas tensions but also gradients of gas tensions.

An important application of the present invention is in the measurement of multiple inert gas tensions in blood samples, both for research and for clinical care of patients. Currently, the multiple inert gas elimination technique (MIGET) has been used to assess lung function in various diseases both at the bench level research setting and in clinical studies. Until now, the MIGET technique has been limited to gas chromatography measurements of blood-phase gas tensions, which severely restricts frequency of measurements and is enormously labor intensive.

The mass spectrometer probe of the present invention could make the MIGET technique much more convenient and rapid and probably more popular in the clinical care of patients. Furthermore, these probes can measure a large number of low molecular weight gases such as $O_2$, $CO_2$, methane, acetone, and alcohols, in a liquid phase and may have applications in real time process monitoring for biochemical fermentation reactors in industry.

The present invention has been described with reference to the enclosed Figures. It is to be appreciated that other embodiments fulfill the spirit and scope of the present invention and that the true nature and scope of the present invention is to be determined with reference to the claims appended hereto.

What is claimed is:

1. A mass spectrometer probe comprising:

a tubing having one end connected to a spectrometer, and a second end defined as a sealed probe tip and having a pore extending therethrough and said pore being filled with a membrane such that said membrane prevents water from entering the tubing and permits low molecular weight gases to enter the tubing by diffusion through the membrane.

2. The mass spectrometer probe of claim 1 wherein said pore has a width of approximately 25,000 Å.

3. The mass spectrometer probe of claim 1 wherein said membrane is constructed from a very low vapor pressure PTFE polymer.

4. The mass spectrometer probe according to claim 3 wherein said very low vapor pressure PTFE polymer comprises a high vacuum grease.

5. The mass spectrometer probe according to claim 1 wherein said membrane comprises a polymeric grease.

6. A mass spectrometer probe for measurement of gas tensions comprising:

a steel tubing comprising a shaped welded tip at one end and connected at a second end to a vacuum fitting for connection to a mass spectrometer system;

said shaped tip containing a pore to permit the leak of gas into said probe and a membrane filling said pore such that said membrane only permits low molecular weight gases into the probe by diffusion through the membrane.

7. The mass spectrometer probe according to claim 6 wherein said membrane comprises a PTFE polymer.

8. The mass spectrometer probe according to claim 7 wherein said PTFE polymer is a very low vapor pressure PTFE polymer.

9. The mass spectrometer probe according to claim 8 wherein said very low vapor pressure PTFE polymer comprises a polymeric grease.

10. The mass spectrometer probe according to claim 6 wherein said pore has a width of about 25,000 Å and a depth of about four microns.

11. A mass spectrometer probe for measurement of gas tensions in blood and saline comprising:

a stainless steel tubing comprising a hemispherically shaped welded tip at one end and connected at a second end to a vacuum fitting for connection to a mass spectrometer system;

said hemispherically shaped welded tip containing a pore to permit the leak of gas into said probe and a membrane filling said pore such that said membrane only permits low molecular weight gases into the probe by diffusion through the membrane.

12. The mass spectrometer probe of claim 11 wherein said pore has a width of approximately 25,000 Å.

13. The mass spectrometer probe of claim 11 wherein said membrane is constructed from a very low vapor pressure PTFE polymer.

14. A method for constructing a mass spectrometer probe for measurement of gas tensions comprising the following steps:

sealing a hollow tubing at one end with a solid tip;

filing a pore at one spot on said solid tip;

inducing a vacuum in the tubing such that a gas leak enters the tubing at said pore and sealing said pore upon the achievement of a desired leak rate with a membrane material such that only low molecular weight gases permeate said membrane.

15. The method of claim 14 wherein said membrane comprises a PTFE polymer.

16. The method of claim 14 wherein said membrane comprises a polymeric grease.

* * * * *